United States Patent [19]

Tsuchiya et al.

[11] Patent Number: 4,779,701
[45] Date of Patent: Oct. 25, 1988

[54] SUPPORT STRUCTURE OF POWER TRANSFER DEVICE IN COMBINATION WITH TRANSMISSION UNIT

[75] Inventors: Fumitomo Tsuchiya; Takeharu Koide; Keisuke Takimura, all of Toyota, Japan

[73] Assignee: Toyota Jidosha Kabushiki Kaisha, Toyota, Japan

[21] Appl. No.: 57,105

[22] Filed: May 26, 1987

[30] Foreign Application Priority Data

May 23, 1986 [JP] Japan .................. 61-78717

[51] Int. Cl.⁴ .............. B60K 5/04; B60K 5/12
[52] U.S. Cl. ..................... 180/292; 180/297
[58] Field of Search ............. 180/292, 297, 299, 247, 180/233, 248, 312; 123/195 A, 198 E

[56] References Cited

U.S. PATENT DOCUMENTS

| | | | |
|---|---|---|---|
| 4,240,517 | 12/1980 | Harlow, Jr. et al. | 180/297 X |
| 4,387,605 | 6/1983 | Gray et al. | 74/694 |

FOREIGN PATENT DOCUMENTS

| | | |
|---|---|---|
| 0009805 | 4/1980 | European Pat. Off. . |
| 0076465 | 4/1983 | European Pat. Off. . |
| 1455882 | 8/1969 | Fed. Rep. of Germany . |
| 3047791 | 1/1981 | Fed. Rep. of Germany . |
| 3035943 | 5/1982 | Fed. Rep. of Germany ...... 180/292 |
| 6095330 | 6/1985 | Japan . |
| 2035235 | 6/1980 | United Kingdom . |

Primary Examiner—David M. Mitchell
Assistant Examiner—Brian L. Johnson
Attorney, Agent, or Firm—Oblon, Fisher, Spivak, McClelland & Maier

[57] ABSTRACT

A support structure of a power transfer device arranged in parallel with an internal combustion engine and integrally assembled with a transmission unit secured at one side thereof to a cylinder block of the engine, which includes a first stiffener fastened at one end thereof to an end portion of a casing of the power transfer device and at another end thereof to the cylinder block of the engine, a second stiffener fastened at one end thereof to an intermediate portion of the power transfer casing and at another end thereof to the cylinder block of the engine, and a third stiffener fastened at one end thereof to a casing of the transmission unit and at another end thereof to the cylinder block of the engine, wherein the stiffeners are made of cast iron.

1 Claim, 4 Drawing Sheets

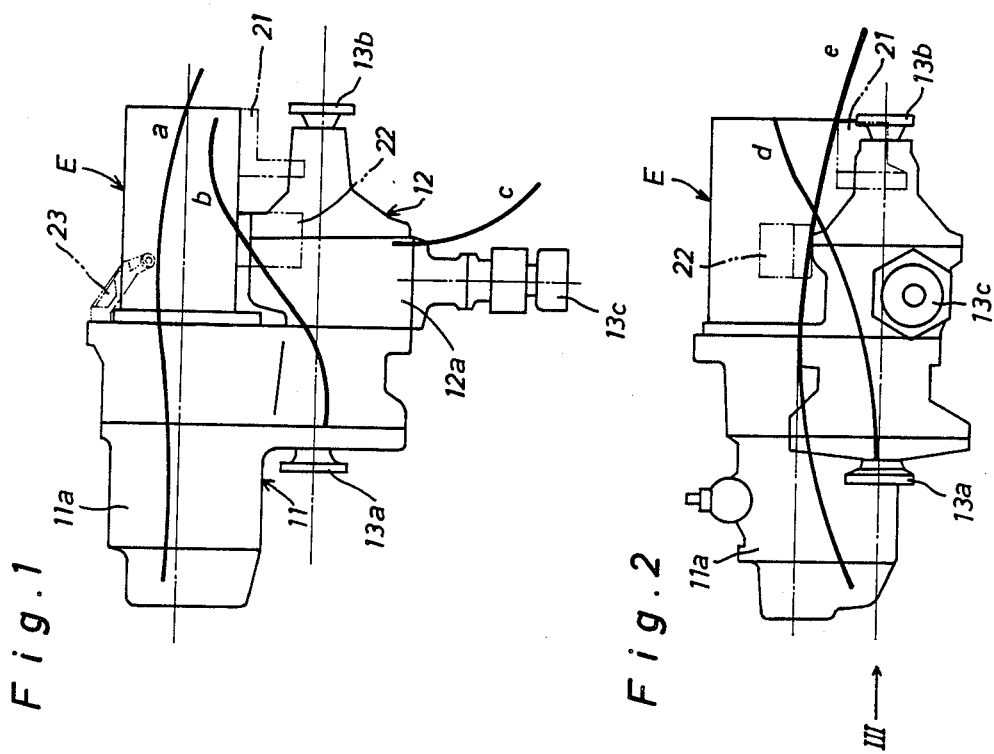

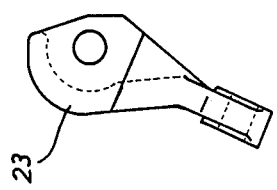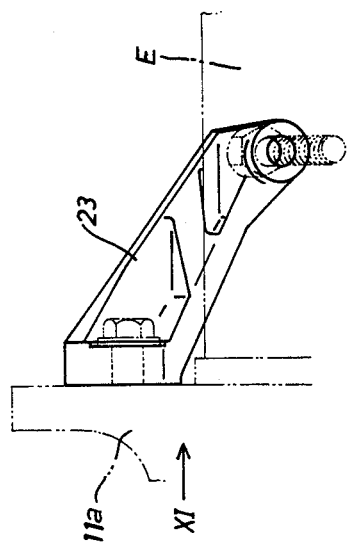

SUPPORT STRUCTURE OF POWER TRANSFER DEVICE IN COMBINATION WITH TRANSMISSION UNIT

BACKGROUND OF THE INVENTION

1. Field of the Invention

The present invention relates to a support structure of a power transfer device in combination with a transmission unit in motor vehicles, and more particularly to a support structure of a power transfer device which is arranged in parallel with an internal combustion engine and integrally assembled with a transmission unit secured at one side thereof to the engine.

2. Discussion of the Background

In such a support structure as described above, the power transfer device is spaced from the engine a distance. This causes vibration of the power transfer device in operation of the transmission unit and results in the occurrence of unpleasant noises. For the purpose of eliminating such unpleasant noises, the casing of the transmission unit has been connected at a portion thereof to a cylinder block of the engine by means of a stiffener in the form of a rigid bracket. However, the casing of the power transfer device is provided therein with an output gearing for rear-wheel drive which is drivingly connected to rear-wheel axles by way of a propeller shaft. In such an arrangement, the power transfer device is applied with large driving reaction from the rear-wheel axles through the propeller shaft. For this reason, it is required to connect the transfer casing to the cylinder block of the engine so as to enhance the coupling strength between the transmission casing and the transfer casing.

SUMMARY OF THE INVENTION

It is, therefore, a primary object of the present invention to provide an improved support structure of the power transfer device which is arranged to effectively enhance the coupling strength between the transmission casing and the transfer casing thereby to eliminate unpleasant noises caused by vibration of the transmission unit and the power transfer device in operation.

According to the present invention, the object is attained by providing a support structure of a power transfer device arranged in parallel with an internal combustion engine and integrally assembled with a transmission unit secured at one side thereof to a cylinder block of the engine, which support structure comprises a first stiffener fastened at one end thereof to an end portion of a casing of the power transfer device and at another end thereof to the cylinder block of the engine, a second stiffener fastened at one end thereof to an intermediate portion of the power transfer casing and at another end thereof to the cylinder block of the engine, and a third stiffener fastened at one end thereof to a casing of the transmission unit and at another end thereof to the cylinder block of the engine, wherein the stiffeners are made of cast iron.

BRIEF DESCRIPTION OF THE DRAWINGS

For a better understanding of the present invention, and to show how the same may be carried into effect, reference will now be made, by way of example, to the accompanying drawings, in which:

FIG. 1 is a plan view schematically illustrating a support structure of a power transfer device in accordance with the present invention;

FIG. 2 is a rear view of the support structure;

FIG. 3 is a side view of a rear portion of the power transfer device indicated by an arrow III in FIG. 2;

FIG. 10 is an enlarged plan view of a third stiffener shown in FIG. 1; and

FIG. 11 is an enlarged side view of the third stiffener indicated by an arrow XI in FIG. 10

DESCRIPTION OF THE PREFERRED EMBODIMENT

Figures 4, 5, 6:
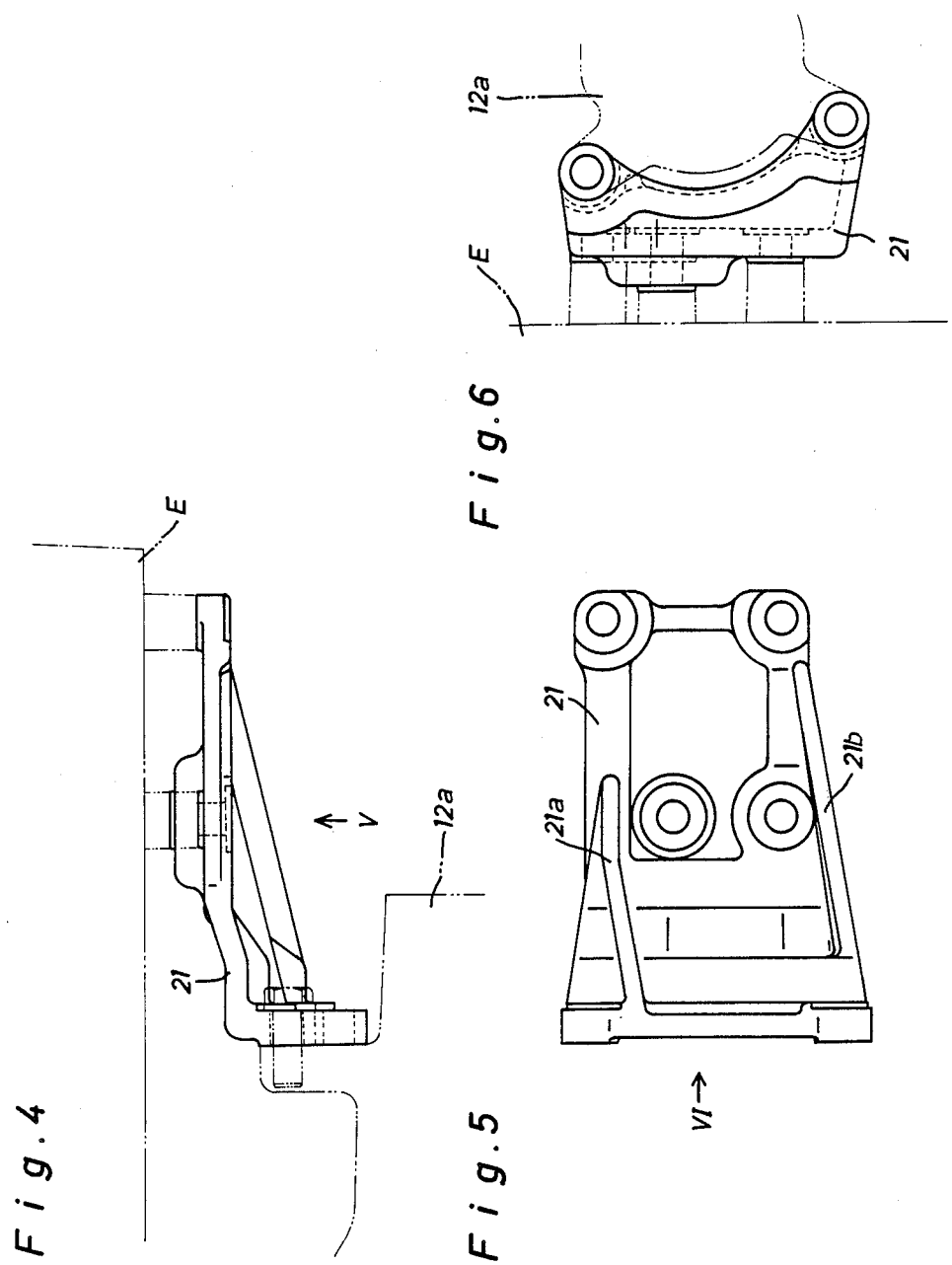
FIG. 4 is an enlarged plan view of a first stiffener shown in FIG. 1.
FIG. 5 is an enlarged rear view of the first stiffener indicated by an arrow V in FIG. 4.
FIG. 6 is an enlarged side view of the first stiffener indicated by an arrow VI in FIG. 5.

In FIGS. 1 to 3 of the drawings, there is schematically illustrated a power transfer device 12 which is arranged in parallel with an internal combustion engine E and integrally assembled with a transmission unit 11. The engine E is transversely mounted on a front portion of a vehicle body structure. The transmission unit 11 has a casing 11a secured at one side thereof to a cylinder block of the engine E by means of bolts (not shown). The transmission casing 11a is formed to contain therein a clutch mechanism, a change speed mechanism, a center differential and a front-drive differential. The change speed mechanism is drivingly connected to a crankshaft of the engine E through the clutch mechanism, the center differential is arranged to split the driving torque from the change speed mechanism into two torque delivery paths respectively for front-wheel drive and rear-wheel drive, and the front-drive differential is arranged to transfer the split driving torque from the center differential to front-wheel axles through a pair of side shafts 13a and 13b.

The power transfer device 12 has a casing 12a secured at one side thereof to the transmission casing 11a by means of bolts (not shown). The transfer casing 12a is formed to contain an output gearing for rear-wheel drive which is arranged to transfer the split driving torque from the center differential to rear-wheel axles (not shown) through a drive pinion shaft 13c. The drive pinion shaft 13c is rotatably mounted within the transfer casing 12a in a fore-and-aft direction of the vehicle and is drivingly connected to the rear-wheel axles through a propeller shaft (not shown).

In such a support structure of the power transfer device 12 as described above, there occur vibration modes respectively in a fore-and-aft direction and a transverse direction as shown by curved lines a, b and c in FIG. 1. Additionally, vibration modes in a vertical direction occur as shown by curved lines d, e and f in FIGS. 2 and 3. In this embodiment, the transmission casing 11a and the transfer casing 12a are connected to the cylinder block of the engine E by means of three stiffeners 21, 22 and 23. The stiffeners 21, 22 and 23 each are made of cast iron.

Figure 9:
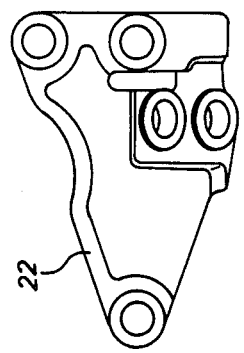
FIG. 9 is an enlarged front view of the second stiffener indicated by an arrow IX in FIG. 8.
Figure 8:
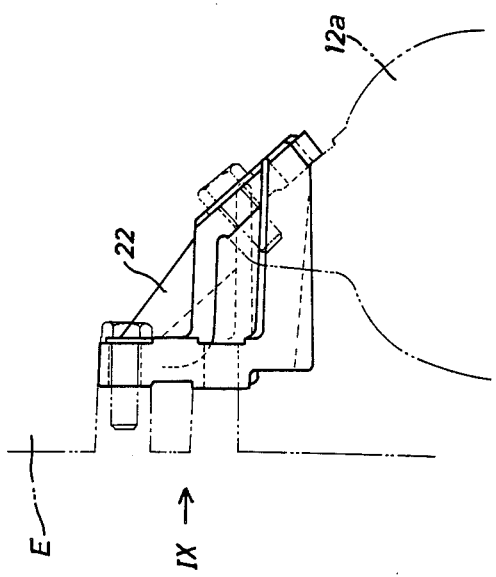
FIG. 8 is an enlarged side view of the second stiffener indicated by an arrow VIII in FIG. 7.
Figure 7:
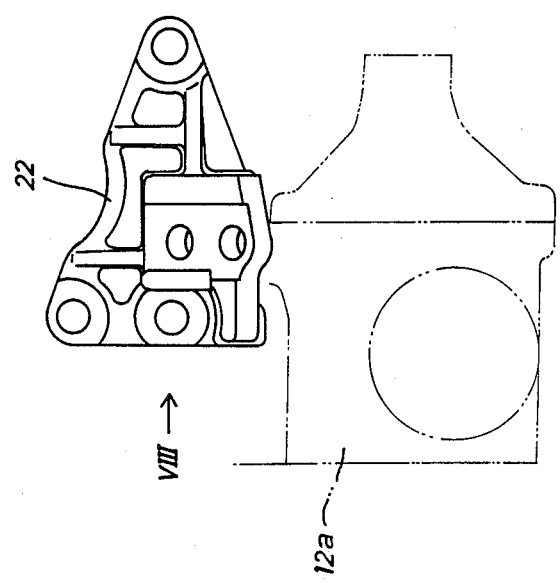
FIG. 7 is an enlarged rear view of a second stiffener shown in FIG. 1.

The first stiffener 21 is arranged to connect the transfer casing 12a to the cylinder block of engine E at its right end portion. As shown in FIGS. 4 to 6, the first stiffener 21 is integrally formed with a pair of lateral reinforcement ribs 21a and 21b against bending stress acting thereon. The first stiffener 21 is bolted at one end thereof to the cylinder block of engine E and at another end thereof to the transfer casing 12a. The second stiffener 22 is arranged to connect the transfer casing 12a to the cylinder block of engine E at an intermediate portion thereof. As shown in FIGS. 7 to 9, the second stiffener 22 is bolted at one end thereof to the cylinder block of engine E and at another end thereof to the transfer casing 12a. The third stiffener 23 is arranged to connect the transmission casing 11a to the cylinder block of engine E. As shown in FIGS. 10 and 11, the third stiffener 23 is bolted at one end thereof to the cylinder block of engine E and at another end thereof to the transmission casing 11a.

In a practical test of the embodiment, it has been confirmed that such arrangement of the three stiffeners 21, 22 and 23 is effective to enhance the coupling strength between the transmission casing 11a and the transfer casing 12a thereby to restrain resonance of the power transfer device caused by driving reaction applied thereto from the rear-wheel axles through the propeller shaft.

What is claimed is:

1. A support structure of a power transfer device having a drive axis arranged in parallel with a crankshaft axis of a transverse internal combustion engine and integrally assembled with a transmission unit secured at one side thereof to an end portion of a cylinder block of the engine, comprising:
   a first stiffener fastened at one end thereof to an end portion of a casing of said power transfer device and at another end thereof to the cylinder block of said engine, said first stiffener including a pair of reinforcement ribs;
   a second stiffener fastened at one end thereof to an intermediate portion of the casing of said power transfer device and at another end thereof to the cylinder block of said engine; and
   a third stiffener fastened at one end thereof to a casing of said transmission unit and at another end thereof to the cylinder block of said engine so as to interconnect said casing of said transmission unit to said cylinder block of said engine,
   wherein said stiffeners are made of cast iron.

* * * * *